United States Patent [19]

Lundvall

[11] Patent Number: 4,505,625
[45] Date of Patent: Mar. 19, 1985

[54] BORING DEVICE

[75] Inventor: Nils G. Lundvall, Ubby, Sweden

[73] Assignee: Santrade Ltd., Lucerne, Sweden

[21] Appl. No.: 346,170

[22] Filed: Feb. 5, 1982

[30] Foreign Application Priority Data

Feb. 19, 1981 [SE] Sweden ................................ 8101109

[51] Int. Cl.³ .......................................... B23B 29/034
[52] U.S. Cl. .................................... 408/155; 408/157; 408/159; 408/170; 408/179
[58] Field of Search .................... 408/713, 714, 82, 83, 408/153, 154, 155, 156, 157, 159, 179, 180, 181, 182, 183

[56] References Cited

U.S. PATENT DOCUMENTS

| | | | |
|---|---|---|---|
| 265,272 | 10/1882 | Moeslein | 408/159 |
| 548,539 | 10/1895 | Harden | 408/183 X |
| 4,011,025 | 3/1977 | Kress | 408/179 X |
| 4,343,576 | 8/1982 | Lagerholm et al. | 408/155 |

Primary Examiner—Z. R. Bilinsky
Attorney, Agent, or Firm—Burns, Doane, Swecker & Mathis

[57] ABSTRACT

A boring head (10; 50) for internal machining of bores in workpieces comprising an insert holder (16; 41) and an operating means (18; 27; 51, 52) resting thereagainst. The operating means is adapted to adjust the insert holder (16; 41) radially when turned about its longitudinal axis. The boring head (10; 50) is associated with control means (21; 28; 63), which are adapted to turn the operating means (18; 27; 51, 52). To advantage the boring head might be provided with a cutting insert, the cutting edge of which comprises a straight forward portion (68) and a convex rear portion (69).

11 Claims, 22 Drawing Figures

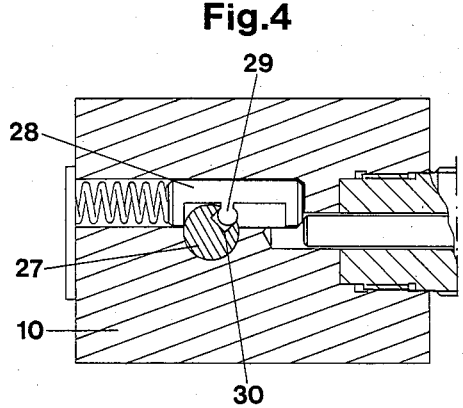
Fig.4
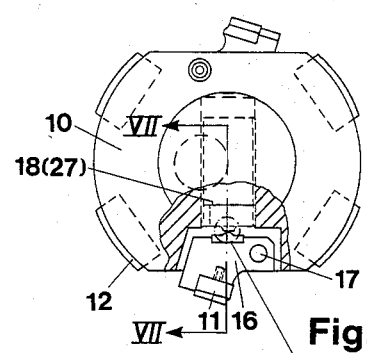
Fig.5
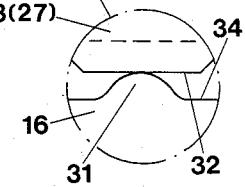
Fig.6
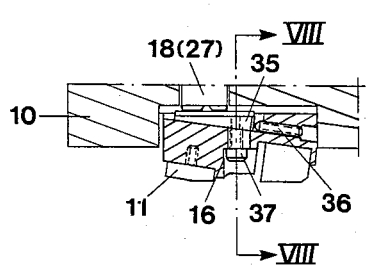
Fig.7
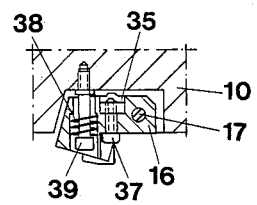
Fig.8
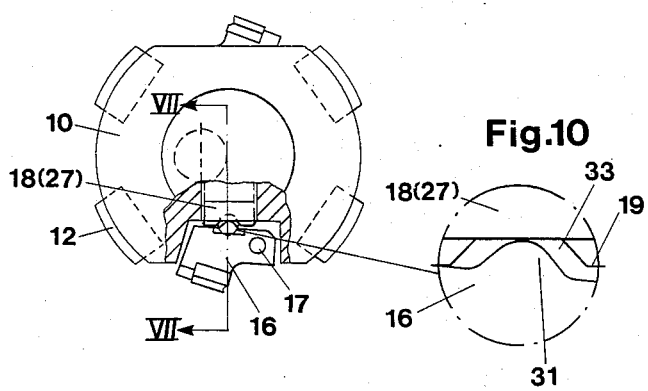
Fig.9
Fig.10
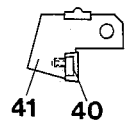
Fig.11

BORING DEVICE

BACKGROUND AND OBJECT OF THE INVENTION

The present invention relates to a boring head for internal machining of bores in workpieces comprising at least one insert holder and an operating means adapted to, by means of a first abutting surface, cooperate with a second abutting surface on the insert holder for radial adjustment thereof. Specifically, the invention relates to the type of boring heads used for skiving, usually called skiving tools, of for instance tubes, which are to be provided with a bearing surface for use in hydraulic cylinders.

During machining operations of the above type the boring head is fed axially through the workpiece. The boring head can be provided with one or several guide pads adapted to support and guide the boring head along the bore in the workpiece. Usually, the boring head is combined with a tool for roller burnishing for finishing the internal surface of the bore to be produced. This burnishing operation is carried out when the skiving tool is returned axially to its initial position before starting a new processing cycle. Before starting the burnishing operation the cutting inserts on the boring head have to be retracted in order not to cause damages on the internal surface of the bore.

In boring heads of the above type it has been proposed, for instance in EP No. 0016744, to arrange the insert holders radially adjustably for purposes of making possible roller burnishing without removing the cutting inserts from the boring head. The object of the present invention is to provide a simple and reliable mechanism in such boring heads for the radial adjustment of the insert holders.

Another object of the invention is to provide improved means for the initial radial positioning of the cutting inserts.

A further object of the invention is to provide an improved cutting insert to be used in connection with roller burnishing.

These and other objects of the invention are attained by giving the invention the characterizing features stated in the appended claims.

THE DRAWINGS

The invention is described in detail in the following with reference to the accompanying drawings in which various embodiments are shown by way of example. It is to be understood that these embodiments are only illustrative of the invention and that various modifications thereof may be made within the scope of the claims.

In the drawings,

FIG. 4 shows a section taken on the line IV—IV in FIG. 3.

FIG. 5 shows an end view, partly in section, of the boring heads in FIGS. 1 and 3, wherein the insert holders carried by the boring heads are in their working positions.

FIG. 6 shows on an enlarged scale the encircled portion in FIG. 5.

FIG. 7 shows a section taken on the line VII—VII in FIG. 5.

FIG. 8 shows a section taken on the line VIII—VIII in FIG. 7.

FIG. 9 shows an end view, partly in section, of the boring heads in FIGS. 1 and 3, wherein the insert holders are in their inactive positions.

FIG. 10 shows on an enlarged scale the encircled portion in FIG. 9.

FIG. 11 shows an alternative embodiment of an insert holder and its cutting insert.

Corresponding details in the various figures have been given the same reference numeral.

DETAILED DESCRIPTION OF PREFERRED EMBODIMENT OF THE INVENTION

Figure 1:
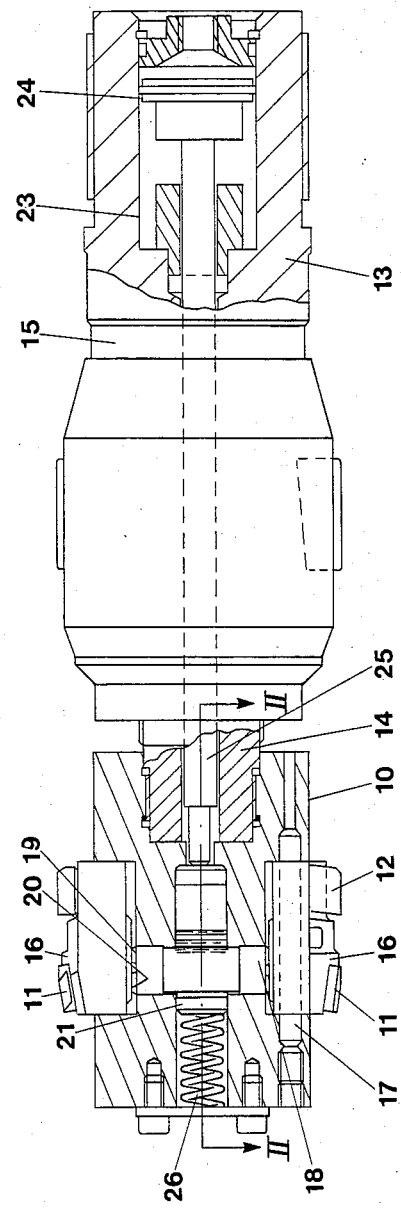
FIG. 1 shows an axial sectional view of a boring head according to the invention, where the boring head is connected to a roller burnishing tool.

The illustrated tool comprises a boring head 10 for skiving operations, which is provided with two diametrically opposed and radially adjustable cutting inserts 11 and longitudinally extending guide pads 12. These pads might be made of wood or bakelite and are adapted to slide against the surface of the bore in the workpiece to be machined. The boring head 10 includes a body portion 10A which is carried by the front portion 14 of an arbor 13. At a certain axial distance from the boring head 10, the arbor 13 also carries a roller burnishing tool 15 for finishing the surface of the bore. This combined tool for boring and burnishing is connected to a feed tube, not shown, by means of which the tool can be advanced axially through a hollow workpiece along a longitudinal axis.

The cutting inserts 11 are detachably clamped on insert holders 16 which thus constitute cutting edge holders. The insert holders are pivotally journalled on bearing pins 17, thereby making possible radial adjustment of the cutting inserts. In the embodiment according to FIGS. 1 and 2 the insert holders 16 are swung by rotation of an operating means in form of a bar 18 about its axis which bar extends within a radial bore 18A between the insert holders. This mode of operation is described in detail in the following. The bar 18 is provided with an abutting surface 19, which is adapted to rest against an abutting surface 20 on the insert holder 16. The surfaces 19, 20 face each other in the direction of the radial axis of the bore.

The boring head 10 is further provided with control means, which comprise an axially extending bar 21, which is adapted to rotate the bar 18 upon axial displacement thereof.

In order to make possible this rotation the bars 18, 21 are operatively interconnected by means of a tooth and rack connection 22.

As previously mentioned the boring head 10 is advanced axially in the bore in the workpiece during the skiving operation. Upon completion of this working cycle the cutting inserts 11 have to be retracted radially to an inner inactive position. In the illustrated embodiment this retraction is achieved by pressurization of the rear, i.e. the right one in FIG. 1, cylinder chamber of a hydraulic cylinder 23. The piston 24 movable in the cylinder 23 is connected to a rod 25, which, upon pressurization of the rear cylinder chamber, moves the bar 21 against the action of a spring 26, thereby, thus, rotating the bar 18 through a limited angle. Then the boring head 10 and the roller burnishing tool 15 are returned axially to their initial position, while simultaneously burnishing the surface of the bore. Upon depressurization of the rear cylinder chamber the bars 18, 21 are moved to their previous positions by means of the spring 26, thereby moving the insert holders 16 to their working positions.

Figure 3:
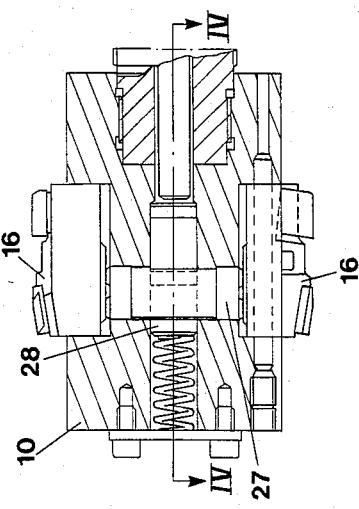
FIG. 3 shows a section through an alternative embodiment of a boring head according to the invention.
Figure 2:
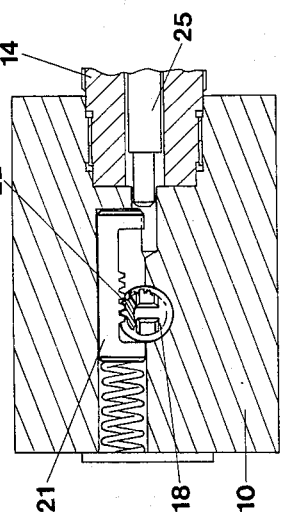
FIG. 2 shows a section taken on the line II—II in FIG. 1.
Figure 12:
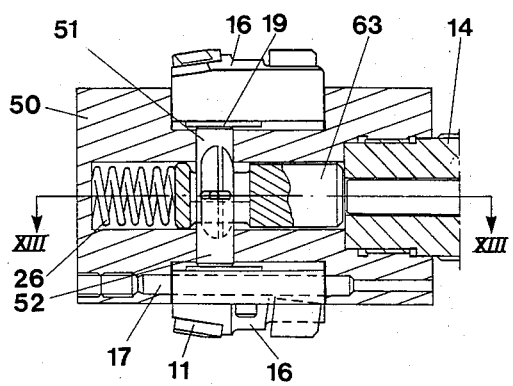
FIG. 12 shows a section through a further alternative embodiment of a boring head according to the invention.
Figure 13:
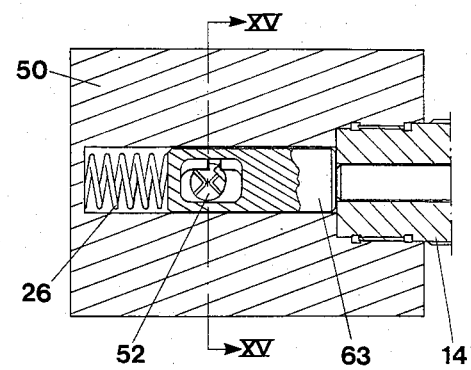
FIG. 13 shows a section taken on the line XIII—XIII in FIG. 12.
Figure 14:
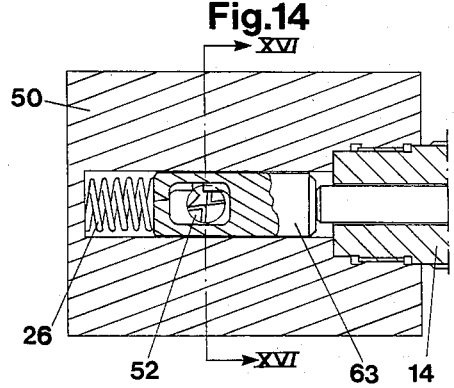
FIG. 14 shows a section similar to that in FIG. 13; the insert holders being in their working positions.
Figure 15:
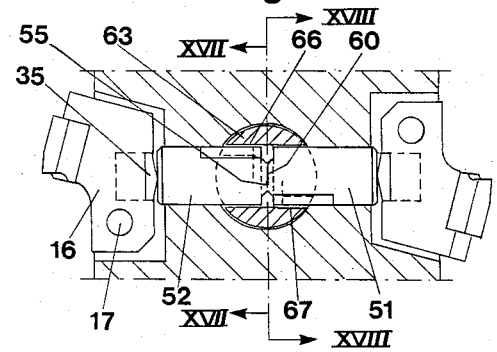
FIG. 15 shows a section taken on the line XV—XV in FIG. 13.
Figure 16:
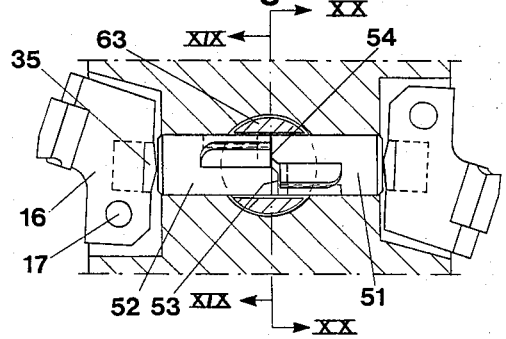
FIG. 16 shows a section taken on the line XVI—XVI in FIG. 14.
Figure 17:
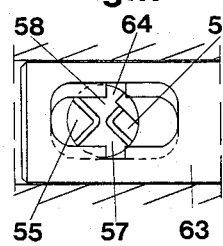
FIG. 17 shows a section taken on the line XVII—XVII in FIG. 15.
Figure 18:
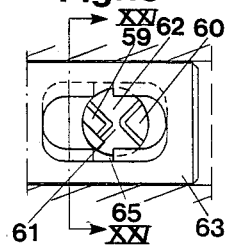
FIG. 18 shows a section taken on the line XVIII—XVIII in FIG. 15.
Figure 19:
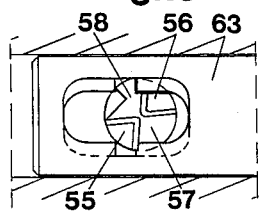
FIG. 19 shows a section taken on the line XIX—XIX in FIG. 16.
Figure 20:
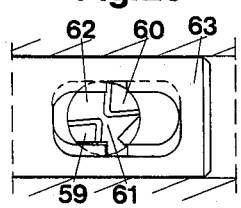
FIG. 20 shows a section taken on the line XX—XX in FIG. 16.
Figure 22:
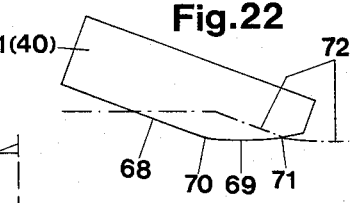
FIG. 22 shows a cutting insert according to the invention intended to be used in a boring head according to the invention.
Figure 21:
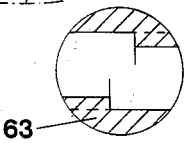
FIG. 21 shows a section taken on the line XXI—XXI in FIG. 18.

The embodiment according to FIGS. 3 and 4 coincides with the embodiment according to FIGS. 1 and 2 except for the operational connection between the operating means 27 of the insert holes 16 and the control means 28 associated therewith. The operating means 27 and the control means 28 comprise, in similarity with the embodiment according to FIGS. 1 and 2, bars; a pin 29 on the bar 28, however, engages a slot 30 in the bar 27.

The bars 18, 27 are longitudinally movable, thereby ensuring that equal cutting depth is obtained for the opposed cutting inserts 11 due to equalization of the cutting forces. As previously mentioned the insert holders 16 are swung upon rotation of the bars 18, 27. According to the invention this is achieved by providing at least one of the bars 18, 27 and the insert holder 16 with portions, which are spaced in the radial direction of the boring head 10, said portions being adapted to cause the adjustment of the insert holders.

In the embodiments according to FIGS. 1, 2 and FIGS. 3, 4, see FIGS. 5 and 6, the abutting surface 20 of the insert holder 16 is provided with a non-abutting lower portion or recess 34 and a projection 31. In the position shown in FIGS. 5, 6 the projection 31 rests against a radially outer cam portion 32 on the abutting surface 19 of the bars 18, 27. The abutting surface 19 is also provided with a recess 33. The recesses 34, 33 are formed by virtue of the fact that the associated cams 31, 32 extend non-continuously in the circumferential direction about the radial axis. Upon rotation of the bars 18, 27 by movement of the bars 21, 28 forwards, i.e. to the left in FIGS. 1–4, the projection 31 is adapted to be received in the recess 33, see FIG. 10, thereby adjusting the insert holders to their radially inner inactive positions. In the embodiments according to FIGS. 1–4 the two end faces of the bars 18, 27 are mutually similarly shaped, and so are also the abutting surfaces on the insert holders 16 cooperating with these end faces.

For purposes of making possible radial initial positioning of the insert holders 16, when needed, and thus vary the radius of the cutting circle generated by the cutting inserts 11 the insert holders 16 are provided with adjusting wedges 35 forming part thereof. The adjusting wedge 35 is moved by means of an adjusting screw 36 and locked in its adjusted position by means of a lock screw 37.

For purposes of ensuring that the insert holders 16 are continuously forced against the opposed end surfaces of the bars 18, 27, i.e. also when the insert holders are adjusted to their inner inactive positions, a spring 38 is compressed between the insert holder 16 and an abutment in form of the head of a bolt screwed into the boring head 10.

In the two embodiments shown in FIGS. 1–4 the cutting inserts 11 are oriented tangentially on the insert holders 16. FIG. 11 shows an alternative embodiment in which a cutting insert 40 is oriented radially on an insert holder 41.

In the embodiment according to FIGS. 12–21 the operating means is designed as two bars 51, 52, which are mutually displaced in the radial direction of the boring head 50. The bars 51, 52 are provided with end faces 53, 54, FIG. 16, which abut against each other. The end face 54 is provided with portions 55, 56, which project in the radial direction of the boring head 50 with respect to portions 57, 58. The end face 53 is provided with portions 59, 60, which project in the radial direction of the boring head 50 with respect to portions 61, 62. In the radially outer working positions of the insert holders 16, FIGS. 13, 15, 17 and 18, the projecting portions 55, 56 on the bar 52 are adapted to rest against the projecting portions 59, 60 on the bar 51. When the insert holders are adjusted to their radially inner inactive positions, FIGS. 14, 16, 19 and 20, the projecting portions 55, 56 and 59, 60, respectively, on the bars 51, 52 are adapted to be received by the lower portions 61, 62 and 57, 58, respectively.

The rotation of the bars 51, 52 is achieved by means of a rod 63, which is displaced in the same manner as the rod 21 in FIG. 1. A displacement of the rod 63 causes the bars 51, 52 to be turned in mutually opposite directions. The operational connection between the rod 63 and the bars 51, 52 is achieved by means of pins 64, 65 on the bars 51, 52, which pins engage in grooves 66, 67 in the rod 63.

According to the invention the cutting inserts 11, 40 are designed with a cutting edge, which comprises a straight portion 68. The straight portion 68 turns into a convex portion 69 at a point 70. The point 70 is situated at a larger distance from the centre line of the boring head 10, 50 than a point 71, which forms the intersection between the surface 72 generated by the preceding cut and the convex portion 69 of the cutting insert. During boring, thus, the straight portion 68 is arranged in front of the convex portion 69 when seen in the boring direction. A cutting insert having a straight portion 68 makes possible, when compared with a cutting insert having solely a convex cutting edge, use of larger cutting depth and increases the free angle at the highest point on the surface generated by the cutting insert, which decreases the heat generation due to the fact that the chip gets a more uniform thickness. A cutting insert having a convex rear portion 69 results, when compared with a cutting insert having a straight cutting edge and a trailing taper, in a larger free angle behind the highest point on the surface generated by the cutting insert. Further, the distance between the highest and the lowest points on this surface becomes smaller. Thus, the surface is easier to roller burnishing due to the fact that a smaller volume of material has to be rolled out.

I claim:

1. A boring head for the internal machining of bores in workpieces, comprising:

a boring head body rotatable about a longitudinal axis and including a radial bore having a radial axis extending perpendicularly to said longitudinal axis, a cutting edge holder movably mounted on said boring head so that a cutting edge carried thereby is movable toward and away from said longitudinal axis, first and second surfaces facing one another in the direction of said radial axis and being yieldably urged toward one another, at least one of said surfaces being rotatable relative to the other about said radial axis, said first and second surfaces including first and second cam means, respectively, which extend circumferentially relative to said radial axis in a non-continuous manner such that in a first relative rotational orientation between said first and second surfaces said first and second cam means are mutually engaged to radially separate said surfaces, and in a second relative rotational orientation between said first and second surfaces said first and second cam means are mutually disengaged to permit said first and second surfaces to be radially converged, said first surface being operably connected to said holder such that when said surfaces are radially separated said first surface is moved radially outwardly and moves said cutting edge radially outwardly from an inactive position to a maximum outward working position, spring means for yieldably urging said first and second surfaces toward one another, and control means for rotating said at least one said surface about said radial axis such that in response to no more than one revolution, said cutting edge is moved from said inactive position to said maximum outward working position.

2. Apparatus according to claim 1, wherein said first surface is carried by said holder, a rotary operating member being rotatable within said bore about said radial axis and carrying said second surface, said second surface defining said one surface which is rotatable about said radial axis.

3. Apparatus according to claim 2 including a second said cutting edge holder carrying a said first surface, said operating member carrying a said second surface at each end.

4. Apparatus according to claim 2, wherein said first surface comprises a portion of a wedge which is adjustably mounted on said holder to adjust the location of said working position of said cutting edge.

5. Apparatus according to claim 1 including first and second rotary operating members disposed in said bore for relative rotation about said radial axis, said first and second operating members carrying said first and second surfaces, respectively, said cutting edge holder engaging an end of said first operating member which is opposite said first surface.

6. Apparatus according to claim 5 including a second said edge carrying holder engaging an end of said second operating member which is opposite said second surface.

7. Apparatus according to claim 5, wherein a portion of said holder which contacts said first operating member comprises a portion of a wedge which is adjustably mounted on said holder to adjust the location of said working position of said cutting edge.

8. Apparatus according to claim 1 including a rotary operating member mounted in said bore for rotation about said radial axis, said operating member carrying said second surface, said control means comprising a bar which is movable in the direction of said longitudinal axis and is operably connected to said operating member to rotate the latter about said radial axis in response to longitudinal movement of said bar.

9. Apparatus according to claim 8, wherein said bar is connected to said operating member by a rack and tooth connection.

10. Apparatus according to claim 8, wherein said bar is connected to said operating member by a pin and slot connection.

11. Apparatus according to claim 1, wherein said holder is pivotably mounted to said boring head, said spring means comprising a spring which biases said holder to its inactive position.

* * * * *